(12) United States Patent
Lee

(10) Patent No.: US 9,504,090 B2
(45) Date of Patent: Nov. 22, 2016

(54) METHOD AND APPARATUS FOR GROUP COMMUNICATION IN PROXIMITY-BASED SERVICE

(71) Applicant: LG Electronics Inc., Seoul (KR)

(72) Inventor: Ki-Dong Lee, San Diego, CA (US)

(73) Assignee: LG ELECTRONICS INC., Seoul (KR)

( * ) Notice: Subject to any disclaimer, the term of this patent is extended or adjusted under 35 U.S.C. 154(b) by 141 days.

(21) Appl. No.: 14/157,924

(22) Filed: Jan. 17, 2014

(65) Prior Publication Data
US 2014/0198708 A1    Jul. 17, 2014

Related U.S. Application Data

(60) Provisional application No. 61/753,854, filed on Jan. 17, 2013, provisional application No. 61/816,165, filed on Apr. 26, 2013, provisional application No. 61/898,460, filed on Oct. 31, 2013.

(51) Int. Cl.
*H04W 88/04* (2009.01)
*H04W 76/02* (2009.01)
*H04W 40/12* (2009.01)

(52) U.S. Cl.
CPC ........... *H04W 88/04* (2013.01); *H04W 76/023* (2013.01); *H04W 40/12* (2013.01); *H04W 76/027* (2013.01)

(58) Field of Classification Search
None
See application file for complete search history.

(56) References Cited

U.S. PATENT DOCUMENTS

| | | | | |
|---|---|---|---|---|
| 6,130,881 A | * | 10/2000 | Stiller | H04L 45/54 370/238 |
| 7,626,966 B1 | * | 12/2009 | Ruiter | H04M 1/725 370/310 |
| 2001/0039181 A1 | | 11/2001 | Spratt | |
| 2002/0176371 A1 | * | 11/2002 | Behzadi | H04L 45/02 370/254 |
| 2003/0096577 A1 | * | 5/2003 | Heinonen | H04L 45/02 455/41.1 |
| 2005/0152318 A1 | * | 7/2005 | Elbatt | H04W 4/00 370/338 |
| 2005/0163091 A1 | * | 7/2005 | Nakasaku | H04L 45/54 370/338 |

(Continued)

OTHER PUBLICATIONS

Anonymous, "RNTI," LTE Quick Reference, XP055290856, Mar. 12, 2011, pp. 1-3.

*Primary Examiner* — Jenee Williams
(74) *Attorney, Agent, or Firm* — Birch, Stewart, Kolasch & Birch, LLP

(57) ABSTRACT

A method of supporting a group communication by a first user equipment (UE) in a wireless communication system is provided. A communication connection is established with a second UE via a first relay UE. The first UE receives, from a first relay UE, a message requesting a relay connection, the message including first information indicating a current hop count, second information indicating a maximum number of allowed hops, and third information on a capacity profile which indicates a maximum number of allowed subordinated UEs. If a condition is satisfied, the relay connection is provided between the first relay UE and a third UE via a second relay UE, the second relay UE being the first UE. If the condition is not satisfied, the relay connection request is rejected.

10 Claims, 11 Drawing Sheets

(56) References Cited

U.S. PATENT DOCUMENTS

| | | | |
|---|---|---|---|
| 2006/0034235 A1* | 2/2006 | Yamane | H04W 24/02 370/338 |
| 2006/0080463 A1* | 4/2006 | Drew | H04L 45/00 709/238 |
| 2007/0159983 A1* | 7/2007 | Eglin | H04L 45/00 370/254 |
| 2007/0195728 A1* | 8/2007 | Chen | H04L 45/00 370/328 |
| 2007/0242622 A1* | 10/2007 | Voyer | H04W 40/246 370/254 |
| 2008/0043638 A1* | 2/2008 | Ribiere | H04L 47/10 370/254 |
| 2008/0076461 A1 | 3/2008 | Itaya et al. | |
| 2008/0085702 A1* | 4/2008 | Park | H04W 40/28 455/422.1 |
| 2008/0261605 A1* | 10/2008 | Larsen | H04L 29/06 455/446 |
| 2009/0067366 A1 | 3/2009 | Aust et al. | |
| 2009/0073924 A1 | 3/2009 | Chou | |
| 2009/0252078 A1 | 10/2009 | Lim et al. | |
| 2009/0285213 A1* | 11/2009 | Chen | H04W 40/28 370/392 |
| 2010/0046426 A1* | 2/2010 | Shenoy | H04L 67/12 370/328 |
| 2010/0128681 A1* | 5/2010 | Breuer | H04W 28/16 370/329 |
| 2011/0134811 A1 | 6/2011 | Hu et al. | |
| 2011/0194511 A1* | 8/2011 | Chen | H04W 72/121 370/329 |
| 2012/0195251 A1* | 8/2012 | Guo | H04L 12/189 370/312 |
| 2012/0327855 A1* | 12/2012 | Lee | H04B 7/155 370/328 |
| 2013/0182621 A1* | 7/2013 | Yagyu | H04W 74/04 370/310 |
| 2013/0242882 A1* | 9/2013 | Blankenship | H04W 72/0453 370/329 |
| 2013/0294366 A1* | 11/2013 | Papasakellariou | H04W 72/0406 370/329 |

\* cited by examiner

METHOD AND APPARATUS FOR GROUP COMMUNICATION IN PROXIMITY-BASED SERVICE

This application claims the benefit of U.S. provisional application 61/753,854, filed on Jan. 17, 2013, U.S. provisional application 61/816,165, filed on Apr. 26, 2013 and U.S. provisional application 61/898,460, filed on Oct. 31, 2013 which are hereby incorporated by reference as if fully set forth herein.

TECHNICAL FIELD

The present invention is directed to a method and an apparatus for use in a wireless communication system. Specifically, the present invention is directed to a method and an apparatus of group communication in proximity-based service.

BACKGROUND ART

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system and the like.

DISCLOSURE

Technical Problem

An object of the present invention is to provide a method and an apparatus of efficiently performing group communication.

It will be appreciated by persons skilled in the art that the objects that can be achieved through the present invention are not limited to what has been particularly described hereinabove and the above and other objects that the present invention can achieve will be more clearly understood from the following detailed description taken in conjunction with the accompanying drawings.

Technical Solution

As an aspect of the invention, a method of supporting a group communication by a first user equipment (UE) in a wireless communication system is provided, in which the method comprises: establishing a communication connection with a second UE via a first relay UE; and receiving, from the first relay UE, a message requesting a relay connection, the message including first information indicating a current hop count, wherein if a condition is satisfied, the relay connection is provided between the first relay UE and a fourth UE via a second relay UE, the second relay UE being the first UE, wherein if the condition is not satisfied, the request of the relay connection is rejected, wherein the condition includes: the current hop count is less than a maximum number of allowed hops.

As another aspect of the invention, a first user equipment (UE) configured to support a group communication in a wireless communication system is provided, in which the first UE comprises: a radio frequency (RF) unit; and a processor, wherein the processor is configured to: establish a communication connection with a second UE via a first relay UE, and receive, from the first relay UE, a message requesting a relay connection, the message including first information indicating a current hop count, wherein if a condition is satisfied, the relay connection is provided between the first relay UE and a fourth UE via a second relay UE, the second relay UE being the first UE, wherein if the condition is not satisfied, the request of the relay connection is rejected, wherein the condition includes: the current hop count is less than a maximum number of allowed hops.

Preferably, second information indicating the maximum number of allowed hops is received from a network node using a paging message, and wherein the paging message is indicated by a physical downlink control channel signal, and the physical downlink control channel signal has a cyclic redundancy check scrambled with a paging radio network temporary identifier (P-RNTI).

Preferably, third information indicating a capacity profile is further received from the network node using the paging message, and wherein the capacity profile indicates a maximum number of allowed subordinated UEs, and the condition further includes: a number of UE served by the first UE is less than the maximum number of allowed subordinated UEs.

Preferably, the capacity profile further indicates a relay mode of the first UE, and the condition further includes: the relay mode allows that relay UEs are mutually served from each other.

Preferably, fourth information indicating a cause for the relay connection is further received from the network node using the paging message, and the condition further includes: the cause for the relay connection is allowed by the first UE.

Preferably, the message requesting the relay connection is received from the first relay UE using a physical shared channel, and the physical shared channel is scrambled using a group Identifier (ID) or a service ID.

Preferably, the physical shared channel is scrambled using a scrambling sequence having an initialization value of the following expression:

$$c_{init} = h \cdot 2^{13} + \lfloor n_s/2 \rfloor \cdot 2^9 + \text{ID}$$

where h is the current hop number, $n_s$ is a slot number in a radio frame, ID is the group ID or the service ID, and $\lfloor \ \rfloor$ is a flooring function.

Advantageous Effects

Exemplary embodiments of the present invention have the following effects. In accordance with the embodiments of the present invention, efficient group communication is provided.

It will be appreciated by persons skilled in the art that the effects that can be achieved through the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

MODE FOR INVENTION

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following embodiments of the present invention can be applied to a variety of wireless access technologies, for example, CDMA, FDMA, TDMA, OFDMA, SC-FDMA, MC-FDMA, and the like. CDMA can be implemented by wireless communication technologies, such as Universal Terrestrial Radio Access (UTRA) or CDMA2000. TDMA can be implemented by wireless communication technologies, for example, Global System for Mobile communications (GSM), General Packet Radio Service (GPRS), Enhanced Data rates for GSM Evolution (EDGE), etc. OFDMA can be implemented by wireless communication technologies, for example, IEEE 802.11 (Wi-Fi), IEEE 802.16 (WiMAX), IEEE 802.20, E-UTRA (Evolved UTRA), and the like. UTRA is a part of the Universal Mobile Telecommunications System (UMTS). 3rd Generation Partnership Project (3GPP) Long Term Evolution (LTE) is a part of Evolved UMTS (E-UMTS) that uses E-UTRA. The LTE-Advanced (LTE-A) is an evolved version of 3GPP LTE. Although the following embodiments of the present invention will hereinafter describe inventive technical characteristics on the basis of the 3GPP LTE/LTE-A system, it should be noted that the following embodiments will be disclosed only for illustrative purposes and the scope and spirit of the present invention are not limited thereto.

Although the following embodiments of the present invention will hereinafter describe inventive technical characteristics on the basis of the 3GPP LTE/LTE-A system, it should be noted that the following embodiments will be disclosed only for illustrative purposes and the scope and spirit of the present invention are not limited thereto. Specific terms used for the exemplary embodiments of the present invention are provided to aid in understanding of the present invention. These specific terms may be replaced with other terms within the scope and spirit of the present invention.

Figure 1:
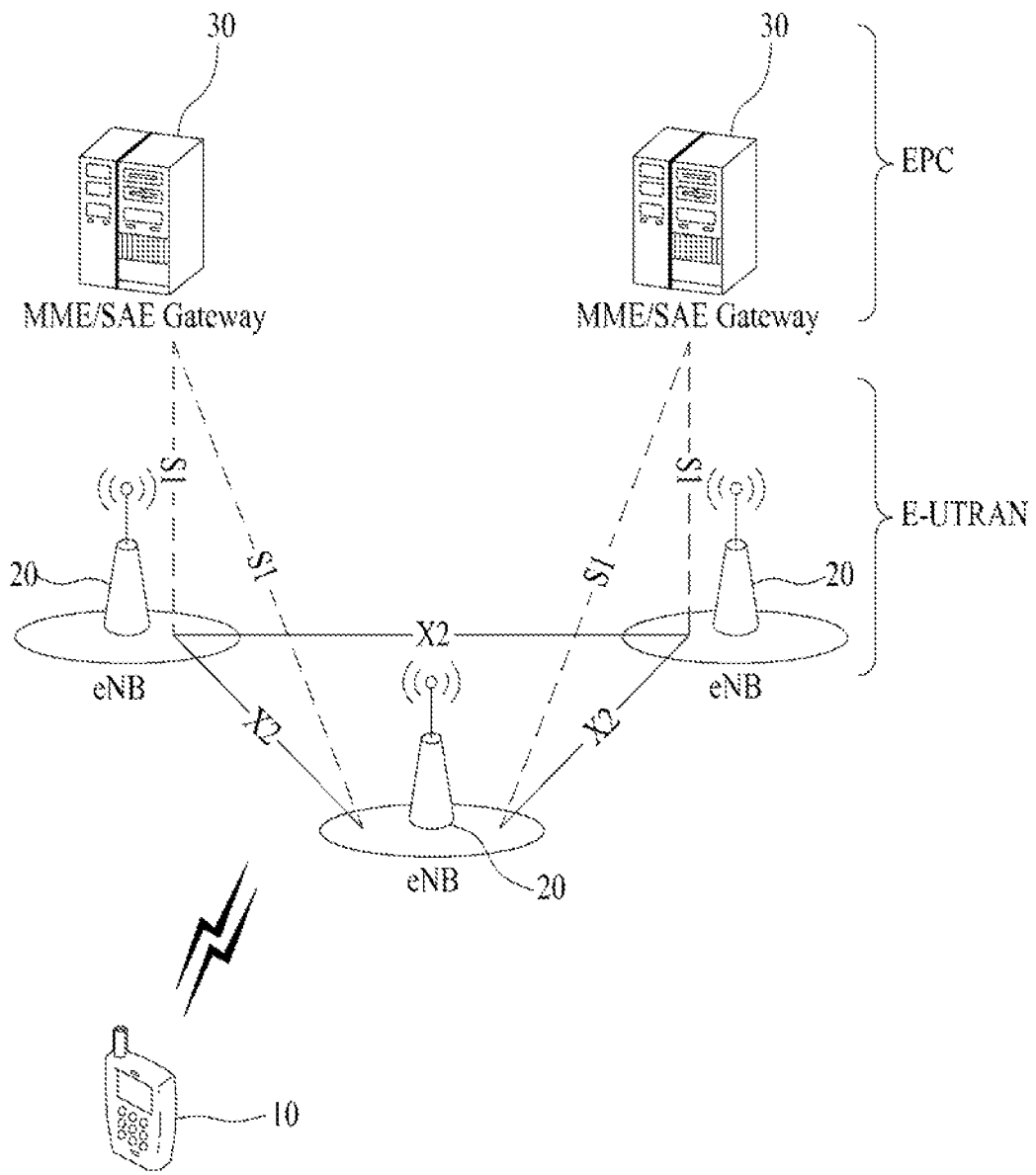
FIG. 1 illustrates a network structure of an Evolved Universal Mobile Telecommunication System (E-UMTS).

FIG. 1 illustrates a network structure of an E-UMTS. The E-UMTS may be also referred to as an LTE system. The E-UMTS is widely deployed to provide a variety of communication services such as voice and packet data, and is generally configured to function based upon the various techniques presented herein and discussed in more detail with regard to later figures.

With reference to FIG. 1, the E-UMTS network includes an Evolved UMTS Terrestrial Radio Access Network (E-UTRAN), an Evolved Packet Core (EPC), and one or more mobile terminals (or User Equipment (UE)) 10. The E-UTRAN includes one or more eNodeBs (eNBs) 20. Regarding the EPC, Mobility Management Entity/System Architecture Evolution (MME/SAE) gateway 30 provides an end point of a session and mobility management function for the UE 10. The eNB 20 and the MME/SAE gateway 30 may be connected via an S1 interface.

The UE 10 is a communication device carried by a user and may also be referred to as a Mobile Station (MS), a User Terminal (UT), a Subscriber Station (SS) or a wireless device. In general, the UE includes a transmitter and processor, among other components, and is configured to operate in accordance with the various techniques presented herein.

The eNB 20 is generally a fixed station that communicates with the UE 10. In addition to being referred to as a base station, the eNB 20 may also be referred to as an access point. An eNB 20 provides end points of a user plane and a control plane to the UE 10. In general, the eNB includes a transmitter and processor, among other components, and is configured to operate in accordance with the various techniques presented herein.

A plurality of UEs 10 may be located in one cell. One eNB 20 is typically deployed per cell. An interface for transmitting user traffic or control traffic may be used between eNBs 20. Here, "downLink (DL)" refers to communication from the eNB 20 to the UE 10, and "UpLink (UL)" refers to communication from the UE to the eNB.

The MME gateway 30 provides various functions including distribution of paging messages to eNBs 20, security control, idle state mobility control, SAE bearer control, and ciphering and integrity protection of Non-Access Stratum (NAS) signaling. The SAE gateway 30 provides assorted functions including termination of U-plane packets for paging reasons, and switching of the U-plane to support UE mobility.

A plurality of nodes may be connected between eNB 20 and gateway 30 via the S1 interface. The eNBs 20 may be connected to each other via an X2 interface and neighboring eNBs may have a meshed network structure that has the X2 interface.

Figure 2:
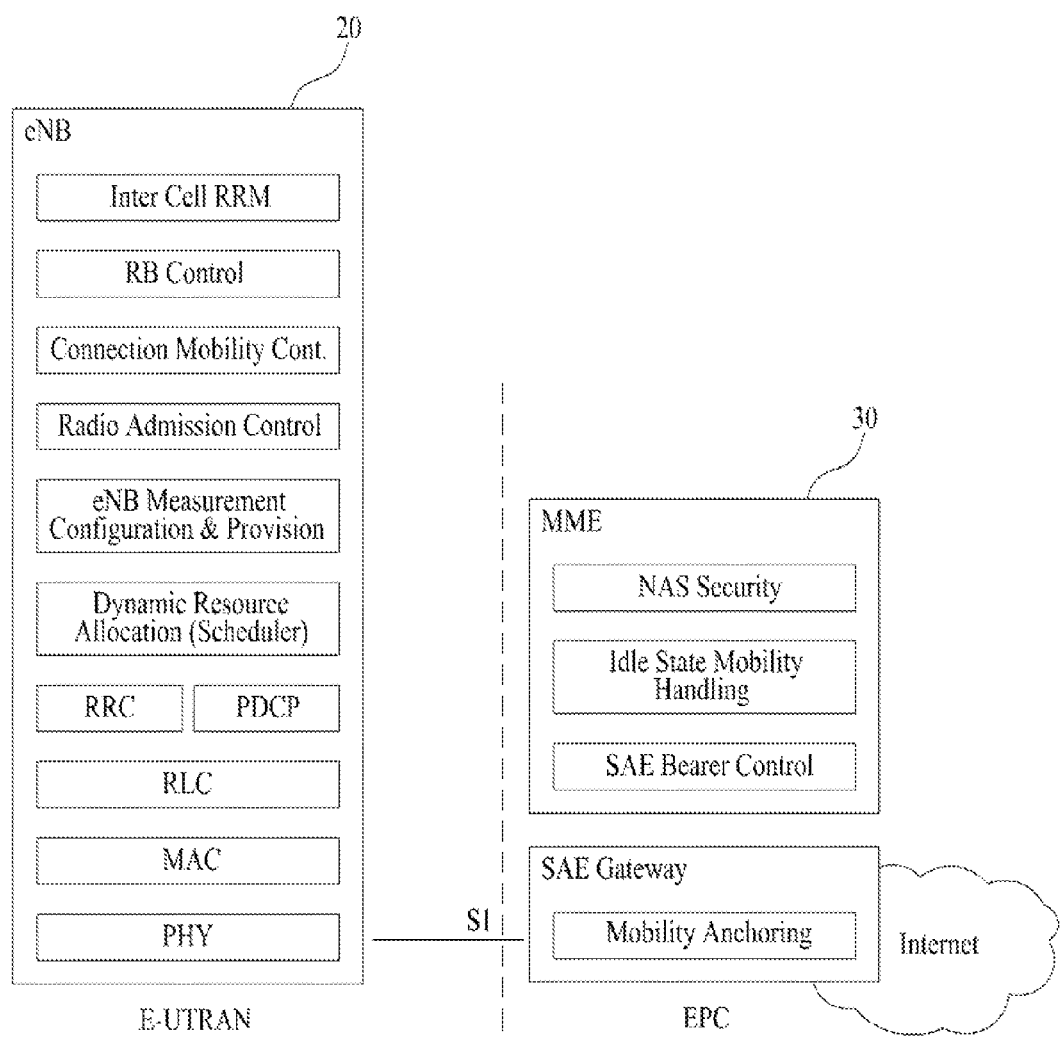
FIG. 2 illustrates a general structure of a typical E-UTRAN and that of a typical Evolved Packet Core (EPC).

FIG. 2 is a block diagram depicting general structures of an E-UTRAN and an EPC. With reference to FIG. 2, eNB 20 may perform functions of selection for MME/SAE gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNB measurements, radio bearer control, Radio Admission Control (RAC), and connection mobility control in LTE_ACTIVE state.

In the EPC, and as described above, MME/SAE gateway 30 may perform functions of paging origination, LTE-IDLE state management, ciphering of the user plane, SAE bearer control, and ciphering and integrity protection of NAS signaling.

Figure 3A:
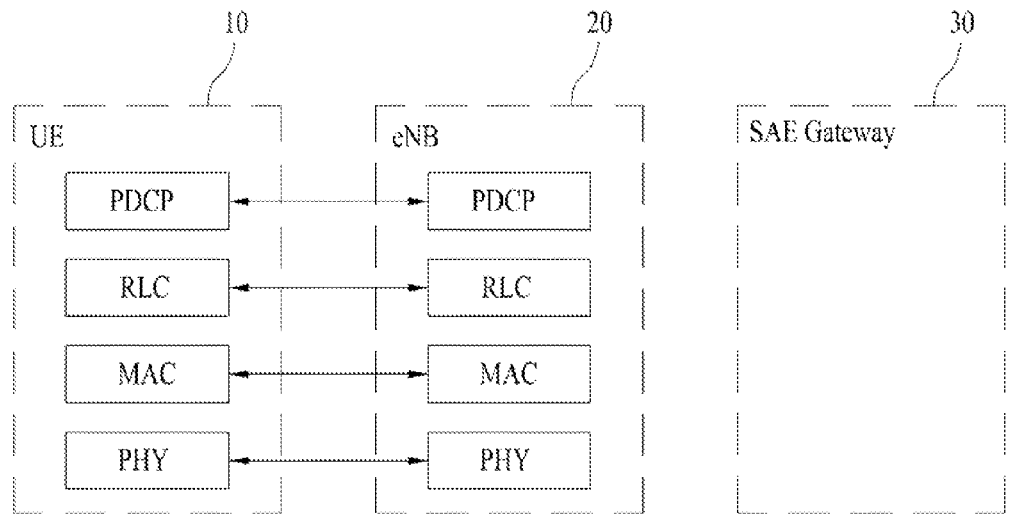
FIGS. 3A~3B illustrate a user-plane protocol and a control-plane protocol stack for the E-UMTS network.
Figure 3B:
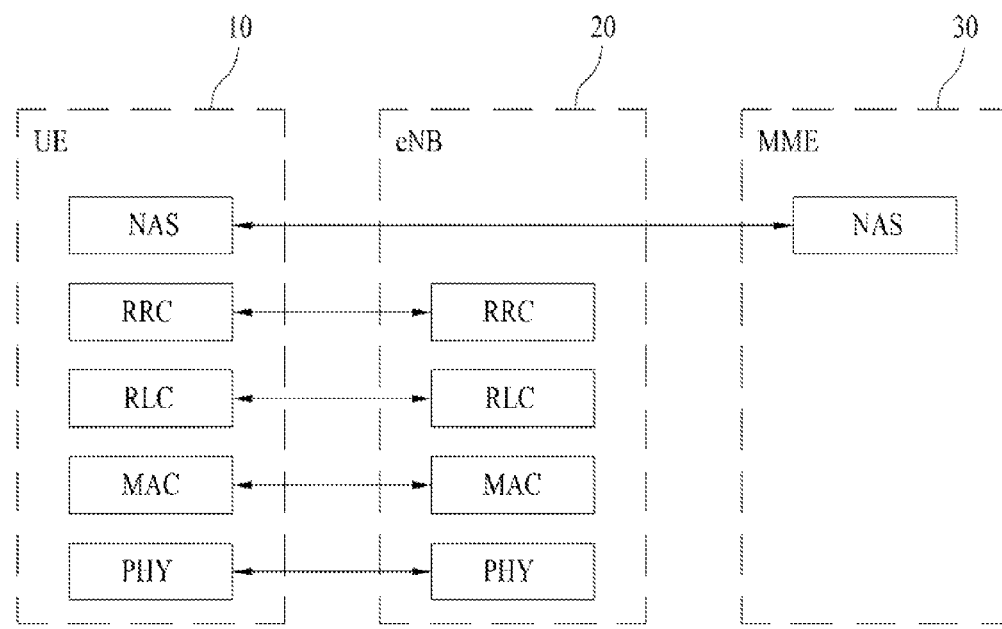

FIGS. 3a-3b illustrate the user-plane protocol and the control-plane protocol stack for the E-UMTS network. With reference to FIGS. 3a-3b, the protocol layers may be divided into a first layer (L1), a second layer (L2) and a third layer (L3) based upon the three lower layers of an Open System Interconnection (OSI) standard model as known in the art of communication systems.

The first layer L1 (or the physical layer) provides an information transmission service to an upper layer using a physical channel. The physical layer is connected with a Medium Access Control (MAC) layer through a transport channel, and data between the MAC layer and the physical layer are transferred via the transport channel. Between different physical layers, namely, between physical layers of a transmission side and a reception side (for example, between physical layers of UE 10 and eNB 20), data are transferred via the physical channel.

The MAC layer of Layer 2 (L2) provides services to a Radio Link Control (RLC) layer via a logical channel. The RLC layer of Layer 2 (L2) supports a reliable transmission of data. Although the RLC layer is shown in FIGS. 3a-3b as being separate from the MAC layer, it is understood that the functions of the RLC layer may be performed by the MAC layer and that, therefore, a separate RLC layer is not required. With reference to FIG. 3a, the Packet Data Convergence Protocol (PDCP) layer of Layer 2 (L2) performs a header compression function that reduces unnecessary control information such that data being transmitted by employing Internet Protocol (IP) packets, such as IPv4 or IPv6, can be efficiently sent over a radio (wireless) interface that has a relatively narrow bandwidth.

With reference to FIG. 3b, a Radio Resource Control (RRC) layer located at the lowest portion of the third layer (L3) is typically only defined in the control plane and controls logical channels, transport channels and the physical channels in relation to the configuration, reconfiguration, and release of the Radio Bearers (RBs). Here, the RB means a service provided by the second layer (L2) for data transmission between the terminal and the E-UTRAN.

With reference to FIG. 3a, the RLC and MAC layers (terminated in an eNB 20 on the network side) may perform functions such as Scheduling, Automatic Repeat reQuest (ARQ), and Hybrid Automatic Repeat reQuest (HARQ). The PDCP layer (terminated in eNB 20 on the network side) may perform the user plane functions such as header compression, integrity protection, and ciphering.

With reference to FIG. 3b, the RLC and MAC layers (terminated in an eNB 20 on the network side) perform the same or similar functions as for the control plane. The RRC layer (terminated in an eNB 20 on the network side) may perform functions such as broadcasting, paging, RRC connection management, RB control, mobility functions, and UE measurement reporting and controlling. The NAS control protocol (terminated in the MME 30 on the network side) may perform functions such as a SAE bearer management, authentication, LTE_IDLE mobility handling, paging origination in LTE_IDLE, and security control for the signaling between the gateway and UE 10.

The NAS control protocol may use three different states: first, a LTE_DETACHED state if there is no RRC entity; second, a LTE_IDLE state if there is no RRC connection while storing minimal UE information; and third, an LTE_ACTIVE state if the RRC connection is established.

Thus RRC state may be divided into two different states such as an RRC_IDLE state and an RRC_CONNECTED state. In the RRC_IDLE state, the UE 10 may receive broadcasts of system information and paging information while the UE specifies a Discontinuous Reception (DRX) configured by NAS, and the UE has been allocated an identification (ID) (e.g., System Architecture Evolution-Temporary Mobile Subscriber Identity (S-TMSI)) which uniquely identifies the UE in a tracking area. Also, in the RRC-IDLE state, no RRC context is stored in the eNB.

In the RRC_IDLE state, the UE 10 specifies the paging DRX (Discontinuous Reception) cycle. Specifically, the UE 10 monitors a paging signal at a specific paging occasion of every UE specific paging DRX cycle.

In the RRC_CONNECTED state, the UE 10 has an E-UTRAN RRC connection and a RRC context is stored in the E-UTRAN, such that transmitting and/or receiving data to/from the network (eNB) becomes possible. Also, the UE 10 can report channel quality information and feedback information to the eNB.

In RRC_CONNECTED state, the E-UTRAN knows the cell to which the UE 10 belongs. Therefore, the network can transmit and/or receive data to/from UE 10, and the network can control mobility (handover) of the UE.

Figure 4:
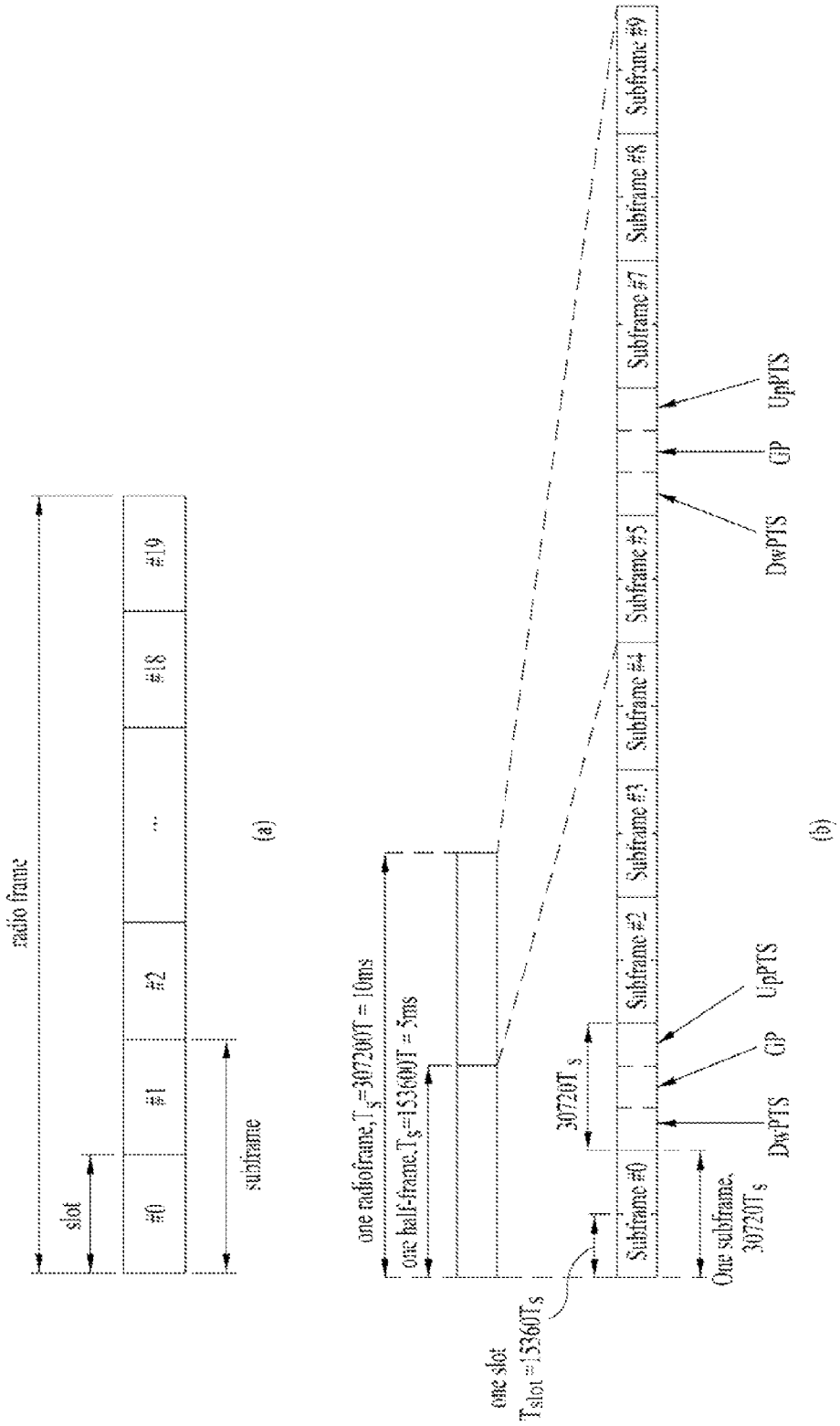
FIG. 4 illustrates a radio frame structure.

FIG. 4 illustrates a radio frame structure. In a cellular OFDM wireless packet communication system, uplink/downlink data packet transmission is performed on a subframe-by-subframe basis. A subframe is defined as a predetermined time interval including a plurality of OFDM symbols. 3GPP LTE supports a type-1 radio frame structure for FDD (Frequency Division Duplex) and a type-2 radio frame structure for TDD (Time Division Duplex).

FIG. 4(a) illustrates a type-1 radio frame structure. A downlink subframe includes 10 subframes each of which includes 2 slots in the time domain. A time for transmitting a subframe is defined as a transmission time interval (TTI). For example, each subframe has a length of 1 ms and each slot has a length of 0.5 ms. A slot includes a plurality of OFDM symbols in the time domain and includes a plurality of resource blocks (RBs) in the frequency domain. Since downlink uses OFDM in 3GPP LTE, an OFDM symbol represents a symbol period. The OFDM symbol may be called an SC-FDMA symbol or symbol period. An RB as a resource allocation unit may include a plurality of consecutive subcarriers in one slot.

The number of OFDM symbols included in one slot may depend on Cyclic Prefix (CP) configuration. When an OFDM symbol is configured with a normal CP, for example, the number of OFDM symbols included in one slot may be 7. When an OFDM symbol is configured with an extended CP, the length of one OFDM symbol increases, and thus the number of OFDM symbols included in one slot is smaller than that in case of the normal CP. In case of the extended CP, the number of OFDM symbols allocated to one slot may be 6. When a channel state is unstable, such as a case in which a UE moves at a high speed, the extended CP can be used to reduce inter-symbol interference.

When the normal CP is used, one subframe includes 14 OFDM symbols since one slot has 7 OFDM symbols. The first three OFDM symbols at most in each subframe can be allocated to a PDCCH and the remaining OFDM symbols can be allocated to a PDSCH.

FIG. 4(b) illustrates a type-2 radio frame structure. The type-2 radio frame includes 2 half frames. Each half frame includes 5 subframes, a Downlink Pilot Time Slot (DwPTS), a Guard Period (GP), and an Uplink Pilot Time Slot (UpPTS). The DwPTS is used for initial cell search, synchronization or channel estimation. The UpPTS is used for channel estimation in a BS and UL transmission synchronization acquisition in a UE. The GP eliminates UL interference caused by multi-path delay of a DL signal between a UL and a DL.

Figure 5:
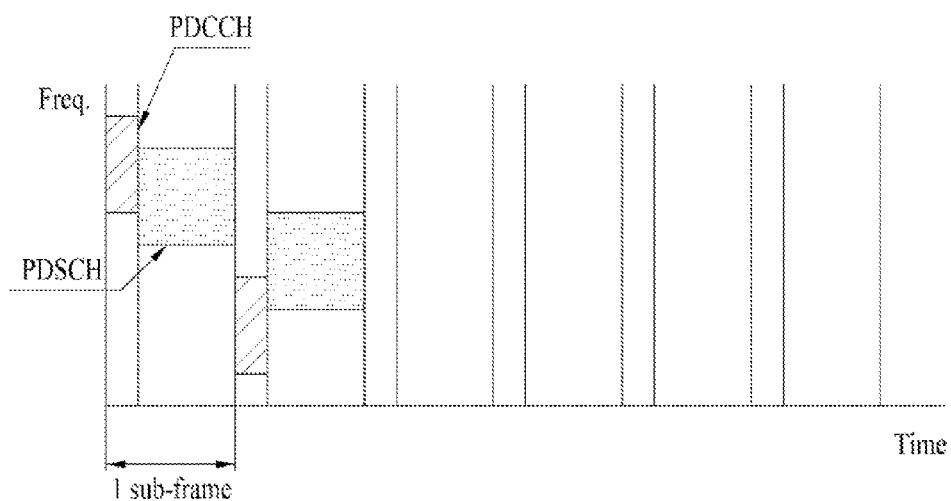
FIG. 5 illustrates a downlink subframe and physical channels.

FIG. 5 illustrates a downlink subframe and physical channels.

With reference to FIG. 5, the downlink subframe includes a plurality of slots (e.g., two). The number of OFDM symbols included in one slot may be changed according to the length of a Cyclic Prefix (CP). For example, in case of a normal CP, the slot may include seven OFDM symbols. The downlink subframe is divided into a data region and a control region in a time domain. A maximum of three (or four) OFDM symbols located in the front part of a first slot of the subframe may correspond to a control region to which a control channel is allocated. The remaining OFDM symbols correspond to a data region to which a Physical Downlink Shared Channel (PDSCH) is allocated. A variety of downlink control channels may be used in LTE(-A), for example, a Physical Control Format Indicator Channel (PCFICH), a Physical Downlink Control Channel (PDCCH), a Physical hybrid ARQ indicator Channel (PHICH), etc. The PCFICH is transmitted on the first OFDM symbol of the subframe, and carries information about the number of OFDM symbols used for transmitting control channels within the subframe. The PHICH carries a Hybrid Automatic Repeat reQuest Acknowledgment/Negative-Acknowledgment (HARQ ACK/NACK) signal as a response to an uplink transmission signal.

Control information transmitted over a PDCCH is referred to as Downlink Control Information (DCI). DCI includes resource allocation information for either a UE or a UE group and other control information. For example, DCI includes UL/DL scheduling information, an UL transmission (Tx) power control command, etc.

The PDCCH carries a variety of information, for example, transmission format and resource allocation information of a DownLink Shared Channel (DL-SCH), transmission format and resource allocation information of an UpLink Shared Channel (UL-SCH), paging information transmitted over a Paging Channel (PCH), system information transmitted over the DL-SCH, resource allocation information of an upper-layer control message such as a random access response transmitted over PDSCH, a set of Tx power control commands of each UE contained in a UE group, a Tx power control command, activation indication information of Voice over IP (VoIP), and the like. A plurality of PDCCHs may be transmitted within a control region. A UE can monitor a plurality of PDCCHs. A PDCCH is transmitted as an aggregate of one or more contiguous Control Channel Elements (CCEs). The CCE is a logical allocation unit that is used to provide a coding rate based on a radio channel state to a PDCCH. The CCE may correspond to a plurality of Resource Element Groups (REGs). The format of PDCCH and the number of PDCCH bits may be determined according to the number of CCEs. A Base Station (BS) decides a PDCCH format according to DCI to be sent to the UE, and adds a Cyclic Redundancy Check (CRC) to control information. The CRC is masked with an identifier (e.g., Radio Network Temporary Identifier (RNTI)) according to a PDCCH owner or a purpose of the PDCCH. For example, provided that the PDCCH is provided for a specific UE, a CRC may be masked with an identifier of the corresponding UE (e.g., cell-RNTI (C-RNTI)). If PDCCH is provided for a paging message, a CRC may be masked with a paging identifier (e.g., Paging-RNTI (P-RNTI)). If a PDCCH is provided for system information (e.g., System Information Block (SIB)), a CRC may be masked with system Information RNTI (SI-RNTI). If PDCCH is provided for a random access response, a CRC may be masked with Random Access-RNTI (RA-RNTI). For example, CRC masking (or scrambling) may be performed using an exclusive OR (XOR) operation between CRC and RNTI at a bit level.

To initiate access to the network, a random access procedure is used. The random access procedure is also referred to as a Random Access Channel (RACH) procedure. Physical Random Access Channel (PRACH) transmission is under control of higher layer protocol which performs some important functions related to priority and load control. The PRACH is a common physical channel dedicated to the random access procedure. There are two kinds of RACH procedures: contention-based RACH procedure and non-contention-based RACH procedure. In the contention-based RACH procedure, many UEs can attempt to access the same base station simultaneously using same RACH preamble/resources, which may lead to network access congestions/collisions. Hereinafter, unless mentioned otherwise, a RACH (or RA) procedure means a contention-based RACH (or RA) procedure.

A RACH procedure can be used for several purposes. For example the RACH procedure can be used to access the network, to request resources, to carry control information, to adjust the time offset of the uplink in order to obtain uplink synchronization, to adjust the transmitted power, etc.

A RACH procedure can be initiated by the UE or the eNB. The RACH procedure may, for instance, be triggered by the following events:

A UE switches from power-off to power-on and needs to be registered to the network.

A UE is not time-synchronized with an eNB and starts transmitting data (for instance the user calls).

An eNB starts transmitting data to the UE but they are not synchronized (for instance the user receives a call).

An eNB measures a delay of the received signal from the UE (for instance the user is moving and has lost synchronization).

Figure 6:
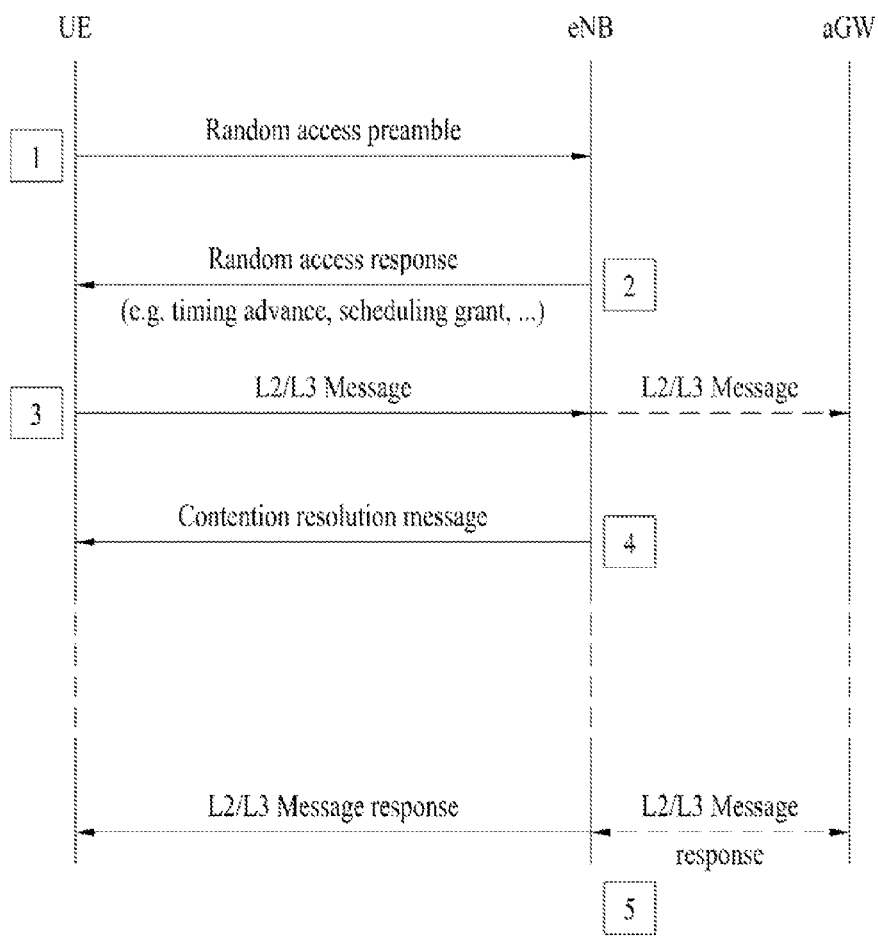
FIG. 6 illustrates a contention-based Random Access (RA) procedure.

FIG. 6 illustrates a contention-based random access procedure.

With reference to FIG. 6, firstly the UE retrieves information transmitted periodically from eNB on a downlink Broadcast Channel (BCH) and selects a preamble signature (e.g., Constant Amplitude Zero Auto-Correlation (CAZAC) sequence), a RACH time slot and a frequency band. The preamble signature is chosen by the UE from among a set of signatures known by the eNB. The UE generates a random access preamble (message 1, box 1) containing the chosen signature and transmits it to the eNB over the selected time slot at the selected frequency. The random access preamble is sent before a RACH connection request and indicates that the UE is about to transmit data. During the random access procedure, several UEs may share the same RACH channel (i.e., PRACH) and they are distinguished by preamble signatures. Congestions/collisions occur whenever several UEs choose the same signature and send it within the same time and frequency resources.

The eNB monitors the current RACH slot in an attempt to detect preambles transmitted from UEs in a corresponding cell. On reception of a signal, the eNB correlates the received signal in the RACH subframe with all possible signatures. Detection of the preamble can be either performed in the time domain or in the frequency domain. A detection variable is computed for each signature. If the detection variable exceeds a certain threshold, the preamble is considered detected.

The eNB sends a random access response (message 2, box 2) to acknowledge the successfully detected preambles. The random access response is sent via a downlink shared channel and includes the detected signature. The random access response also contains a timing advance command, a power-control command.

If the UE receives a random access response from the eNB, the UE decodes the random access response and adapts UL transmission timing, and UL transmission power if the random access response contains power control information. The UE then sends a resource request message (message 3, box 3) via an uplink shared channel. In the message 3, the UE requests bandwidth and time resources to transmit data and it also indicates a UE-specific identifier. When the UE requests resources, the UE uses a specific ID in the message 3 to resolve contentions. Then the UE monitors a specified downlink channel for response from the eNB. In the case of a positive resource grant, the subsequent transmissions are carried out as normal.

The eNB attempts to resolve any contentions. If the eNB receives a resource request with a UE-specific signature, the eNB checks how many UEs were detected with the same signature and resolves any possible contentions. If the preamble sent by a UE was in collision with a preamble from another UE, the eNB sends a contention resolution message (message 4, box 4) to command a corresponding UE to re-start the RACH procedure. If the UE was not in collision, the eNB sends a resource assignment message (message 5, box 5). Subsequent transmissions are carried out as usual.

Proximity-Based Service (ProSe)

Recently, Proximity-based Service (ProSe) has been discussed in 3GPP. The ProSe enables different UEs to be connected (directly) each other (after appropriate procedure(s), such as authentication), through eNB only (but not further through Serving Gateway (SGW)/Packet Data Network Gateway (PDN-GW, PGW)), or through SGW/PGW. The ProSe has various use cases and potential requirements for an operator network controlled discovery and communications between wireless devices that are in proximity, under continuous network control, and are under a 3GPP network coverage, for:

Commercial/social use
Network offloading
Public Safety
Integration of current infrastructure services, to assure the consistency of the user experience including reachability and mobility aspects
Public Safety, in case of absence of EUTRAN coverage (subject to regional regulation and operator policy, and limited to specific public-safety designated frequency bands and terminals)

Figure 7:
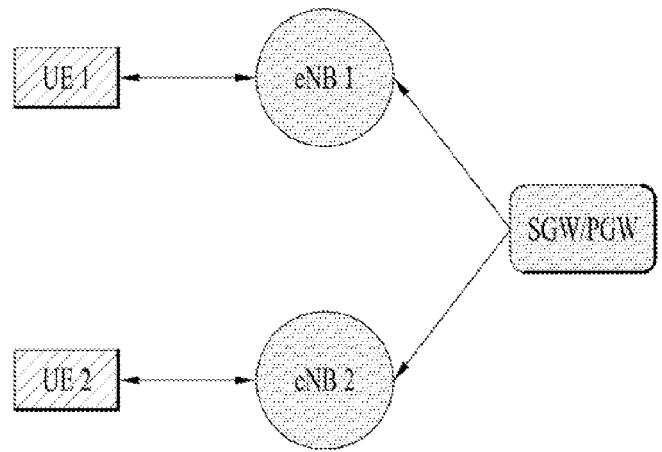
FIG. 7 illustrates an example of default data path for a normal communication.

FIG. 7 illustrates an example of default data path for communication between two UEs. With reference to FIG. 7, even when two UEs (e.g., UE 1, UE 2) in close proximity communicate with each other, their data path (user plane) goes via the operator network. Thus a typical data path for the communication involves eNB(s) and/or Gateway(s) (GW(s)) (e.g., SGW/PGW).

Figure 8A:
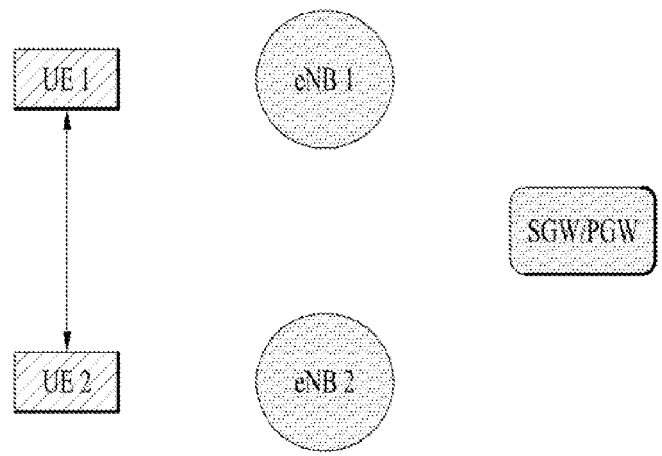
FIGS. 8A~8B illustrate examples of data path scenarios for a proximity communication.
Figure 8B:
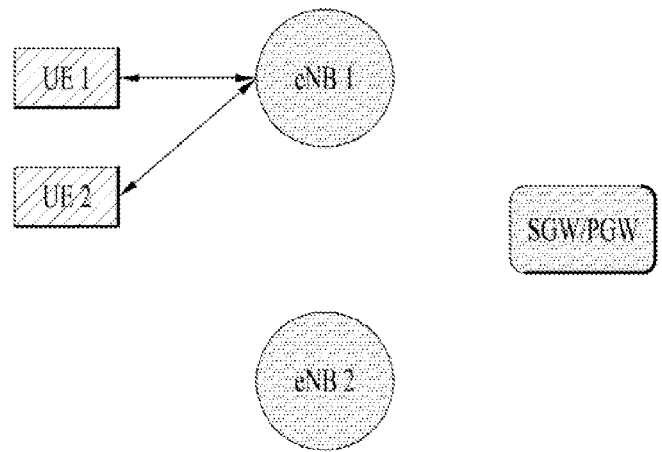

FIGS. 8A~8B illustrate examples of data path scenarios for a proximity communication. If wireless devices (e.g., UE 1, UE 2) are in proximity of each other, they may be able to use a direct mode data path (FIG. 8A) or a locally routed data path (FIG. 8B). In the direct mode data path, wireless devices are connected directly each other (after appropriate procedure(s), such as authentication), without eNB and SGW/PGW. In the locally routed data path, wireless devices are connected each other through eNB only.

Hereinafter, procedures for group communication services using a mobile relay (e.g., UE acting as a relay) will be explained. First, following definitions are used.

Group Communication System Enabler (GCSE): A 3GPP feature enabling an application layer functionality to provide group communication over E-UTRAN.

GCSE_LTE: GCSE over LTE. A UE supporting GCSE_LTE is referred to a GCSE_LTE UE. For example, GCSE_LTE UE includes a ProSe-enabled UE.

GCSE Group: A set of members (e.g., GCSE_LTE UEs) entitled to participate in a group communication service.

Network Coverage: Cellular network coverage, e.g., 3GPP network coverage.

Multipoint Service: A service used to distribute the same content to many UEs in a resource efficient way.

Hop count: The number of hops from a current node (e.g., myself) to a reference node. For example, if there are N nodes between the current node and the reference node, the hop number is given as N+1. The reference node may be an end node in wireless relay operation. For example, for a relay connection including a BS, the reference node may be the (closest) connected or camped-on BS, and for a relay connection including UEs only, the reference node may be an origin UE (or a source UE) or a destination UE.

Mobile relay (or UE relaying): A relay (procedure) in which a mobile device acts as a relay. A UE acting as a relay may be referred to a relay UE. For example, in terms of a signal path, the relay UE may be placed between a UE and a UE (in case of UE-to-UE relay) or between a UE and a BS (in case of UE-to-Network relay). In the present invention, a mutual relay and a normal relay are defined for easy understanding.

Mutual relay (or Mutual UE relaying): A case that a UE acts as a relay for other UE(s) and is also served as a subordinate by any of them in UE Relaying, and may have Direct ProSe Communication (peer-to-peer) with other UE at the same time. That is, relay UEs can be served from each other. For example, when UE A acts as a relay for UE B, UE A can be also served as a subordinate by UE B (i.e., UE B acts as a relay for UE A).

For example, when UE A acts as a relay for UE B, UE B also acts as a relay for UE A.

Normal relay (or Normal UE relaying): A case that a UE acts as a relay for other UE(s) but is not served as a subordinate by any of them in UE Relaying, and optionally does not have Direct ProSe Communication (peer-to-peer) with other UE at the same time. For example, when UE A acts as a relay for UE B, UE A cannot be served as a subordinate by UE B (i.e., UE B cannot act as a relay for UE A).

The term of "normal UE Relaying" is the case one UE acts as a relay for other UE(s) but is not served by any of them as a subordinate of either of them in UE Relaying (mutual UE relaying is not normal UE Relaying) and does not have Direct ProSe Communication (peer-to-peer) with other UE at the same time.

In GCSE_LTE, a UE that belongs to a group (i.e., GCSE_LTE group) has a tendency of moving around as needed and therefore there are needs for dynamic relay functions accordingly. However, it is not clearly discussed how a network can handle the scope of relaying functionality in terms of operational complexity and service reliability: specifically, the maximum number of hops in relaying Origin-Destination (O-D) pairs and the network's capability of decision making on this information. It is useful to ensure this information under the network operator's control in order to keep the complexity of operations manageable and therefore to keep ongoing service more reliable. To this end, various methods for providing dynamic relaying functionality in group communication services will be proposed. Here, group communications between GCSE_LTE UEs (e.g., ProSe-enabled UEs) will be mainly explained, but this is exemplary. The present invention can be also applied to group communications between various mobile devices supporting proximity services.

First, dynamic configuration of relaying functions will be explained. Specifically, if an Evolved Packet Core (EPC) and an Evolved UTRAN (E-UTRAN) support ProSe, the EPC and E-UTRAN may be able to dynamically configure relaying functions (e.g., the maximum number of hops for relaying, and capacity profile). In this case, two methods may be considered to provide the dynamic configuration of relaying functions to a mobile relay (e.g., a UE, preferably a ProSe-enabled UE). In the first method (for convenience, Method 1.1), the EPC and the E-UTRAN may send configuration information (e.g., maximum number of relaying hops for GCSE_LTE, capacity profile) to an eNB. Then, the eNB may send the information to the GCSE_LTE UEs via system information (e.g., system Information Block (SIB) Type X). Here, SIB TypeX may be an existing SIB or a newly defined SIB. In the second method (for convenience, Method 1.2), the EPC and the E-UTRAN may send configuration information (e.g., maximum number of relaying hops for GCSE_LTE, capacity profile) to GCSE_LTE UE(s), which is transparent to the eNB. To this end, for example, a NAS message including the configuration information may be sent to GCSE_LTE UE(s) by using a paging.

Here, the maximum number of relaying hops for GCSE_LTE (simply, max hop count) may represent the maximum number of allowed hops from a reference node to a UE. The reference node may be a BS or another UE (e.g., an origin UE, a destination UE). For example, if max hop count is 1, no UE can get network connection through ProSe UE Relay since at least two hops are necessary for relay operation. And, the capacity profile may indicate a relay mode (e.g., mutual relay, normal relay, and so on) and/or a relay capacity (e.g., "you can serve up to 1 subordinate UE", "you can serve up to 2 subordinate UEs", and so on).

TABLE 1

An example of capacity profiles

Representation (example): AAAABBBBCCCC

| Capacity Profile | Mutual UE Relaying capability: AAAA | (normal) UE Relaying capability: BBBB | (additional) ProSe Direct Communication capability: CCCC |
|---|---|---|---|
| 1 mutual UE Relaying possible | 0001 | — | — |
| 2 mutual UE Relaying possible | 0010 | — | — |
| ... | ... | ... | ... |
| 1 UE Relaying possible | 0000 | 0001 | 0000 |
| 1 UE Relaying and 1 ProSe Direct communication possible | 0000 | 0001 | 0001 |

TABLE 1-continued

An example of capacity profiles

Representation (example): AAAABBBBCCCC

| Capacity Profile | Mutual UE Relaying capability: AAAA | (normal) UE Relaying capability: BBBB | (additional) ProSe Direct Communication capability: CCCC |
|---|---|---|---|
| 2 UE Relaying possible | 0000 | 0010 | 0000 |
| 2 UE Relaying and 1 ProSe Direct communication possible | 0000 | 0010 | 0001 |
| ... | ... | ... | ... |

For example, if a UE receives AAAA=0001, the UE is allowed to make one mutual UE Relaying connection (see, FIG. 12 below); if a UE receives AAAA=0010, the UE is allowed to make two mutual UE Relaying connections (see, FIG. 13 below).

For example, if a UE receives BBBB=0010, this means that this UE is allowed to make two (normal) UE Relaying connection.

In the table, a binary representation of AAAABBBBCCCC, which equals to AAAA<<8|BBBB<<4|CCCC (in programming language), or $2^8*(AAAA)+2^4*(BBBB)+2^0*(CCCC)$.

If the mutual UE Relaying is possible, the normal UE Relaying and the ProSe direct communication are also possible. Thus if the mutual UE Relaying is possible, there is no need to indicate whether the normal UE Relaying and/or the ProSe direct communication are possible or not. For this reason, information indicating the capacity profile may include AAAA if AAAA indicates that the mutual UE Relaying is possible. Otherwise, the information indicating the capacity profile may further include BBBB and CCCC. Similarly, a UE may first try to decode/interpret AAAA in the information indicating the capacity profile. Then, if AAAA indicates that the mutual UE Relaying is possible, the UE may assume that there is no further information and stop decoding/interpreting the information indicating the capacity profile. Meanwhile, if AAAA does not indicate that the mutual UE Relaying is possible, the UE may assume that there is further information and keep further decoding/interpreting the information indicating the capacity profile. In addition, if UE capacity could not support a signaled capacity profile, a corresponding UE may disregard/drop the signaled capacity profile.

By using the capacity profile, an operator network can indicate to a ProSe-enabled UE a degree of allowance, when acting as a ProSe UE-to-UE Relay and/or ProSe UE-to-Network Relay, on accommodating other ProSe-enabled UEs. By doing so, the network can inform the UE how many data connections it is allowed to make for how much data rate or Quality of Service (QoS), etc.

Figure 9:
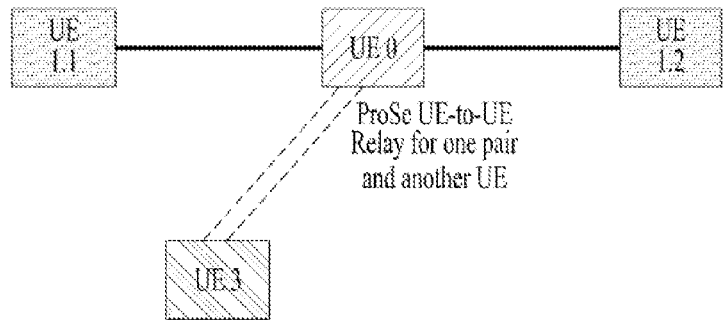
FIGS. 9~13 illustrate examples of group communication based on capability profiles in accordance with the present invention.
Figure 10:
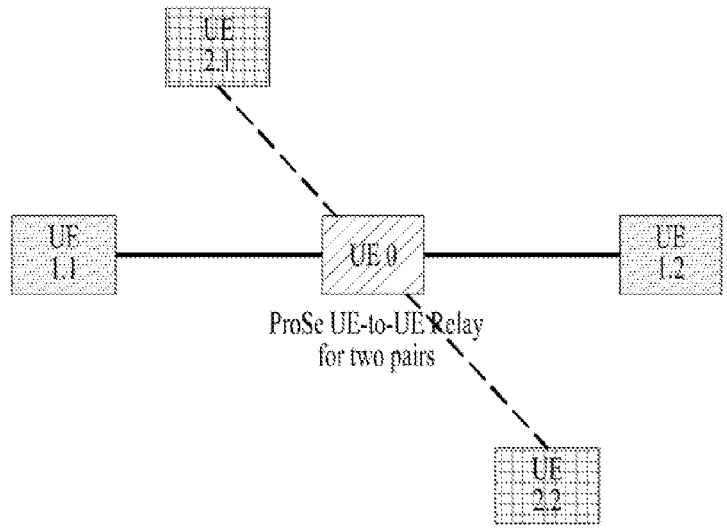
Figure 11:
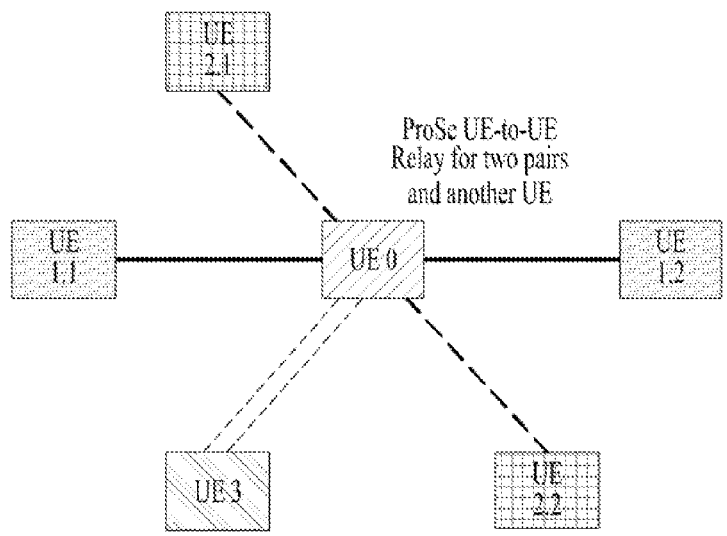
Figure 12:
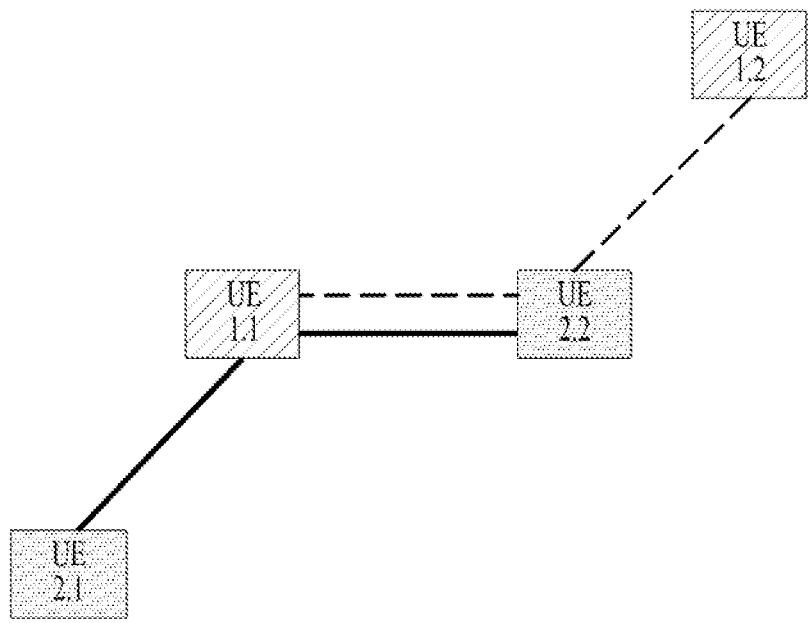
Figure 13:
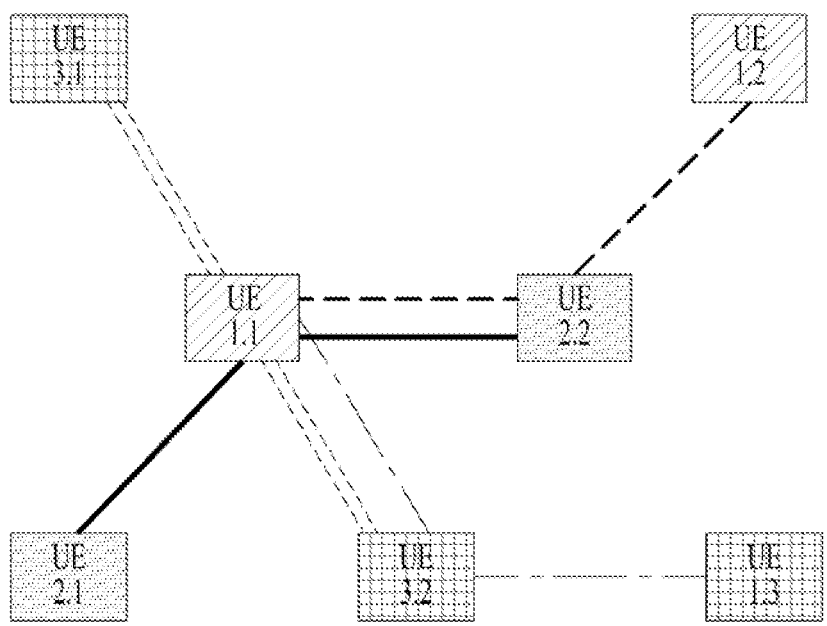

FIGS. 9~13 show various cases for group communication based on capability profiles in accordance with the present invention. Specifically, FIG. 9 shows a ProSe UE-to-UE Relay (UE 0) for one pair of two Public Safety ProSe-enabled UEs (UE 1.1 and UE 1.2) not served by E-UTRAN, which also has an established data connection to another ProSe-enabled UE (UE 3). FIG. 9 may correspond to a case when a capacity profile of UE 0 is given as 0000 0001 0001 (i.e., 1 normal UE relaying, 1 direct communication). FIG. 10 shows a ProSe UE-to-UE Relay (UE 0) for more than one pair of two Public Safety ProSe-enabled UEs (UE 1.1 and UE 1.2; UE 2.1 and UE 2.2) not served by E-UTRAN. FIG. 10 may correspond to a case when a capacity profile of UE 0 is given as 0000 0010 0000 (i.e., 2 normal UE relaying only). FIG. 11 shows a ProSe UE-to-UE Relay (UE 0) for more than one pair of two Public Safety ProSe-enabled UEs (UE 1.1 and UE 1.2; UE 2.1 and UE 2.2) not served by E-UTRAN, which also has an established data connection to another ProSe-enabled UE (UE 3). FIG. 11 may correspond to a case when a capacity profile of UE 0 is given as 0000 0010 0001 (i.e., 2 normal UE relaying, 1 direct communication). FIG. 12 shows a ProSe UE-to-UE Relay (UE 1.1) for one pair of two Public Safety ProSe-enabled UEs (UE 2.1 and UE 2.2) while being served by one of the pair (UE 2.2) acting as another ProSe UE-to-UE Relay. FIG. 13 shows a ProSe UE-to-UE Relay (UE 1.1) acting as a mutual UE Relay with two mutual UE Relaying connections: one between UE 1.1 and UE 2.2, the other between UE 1.1 and UE 3.2.

Figure 14:
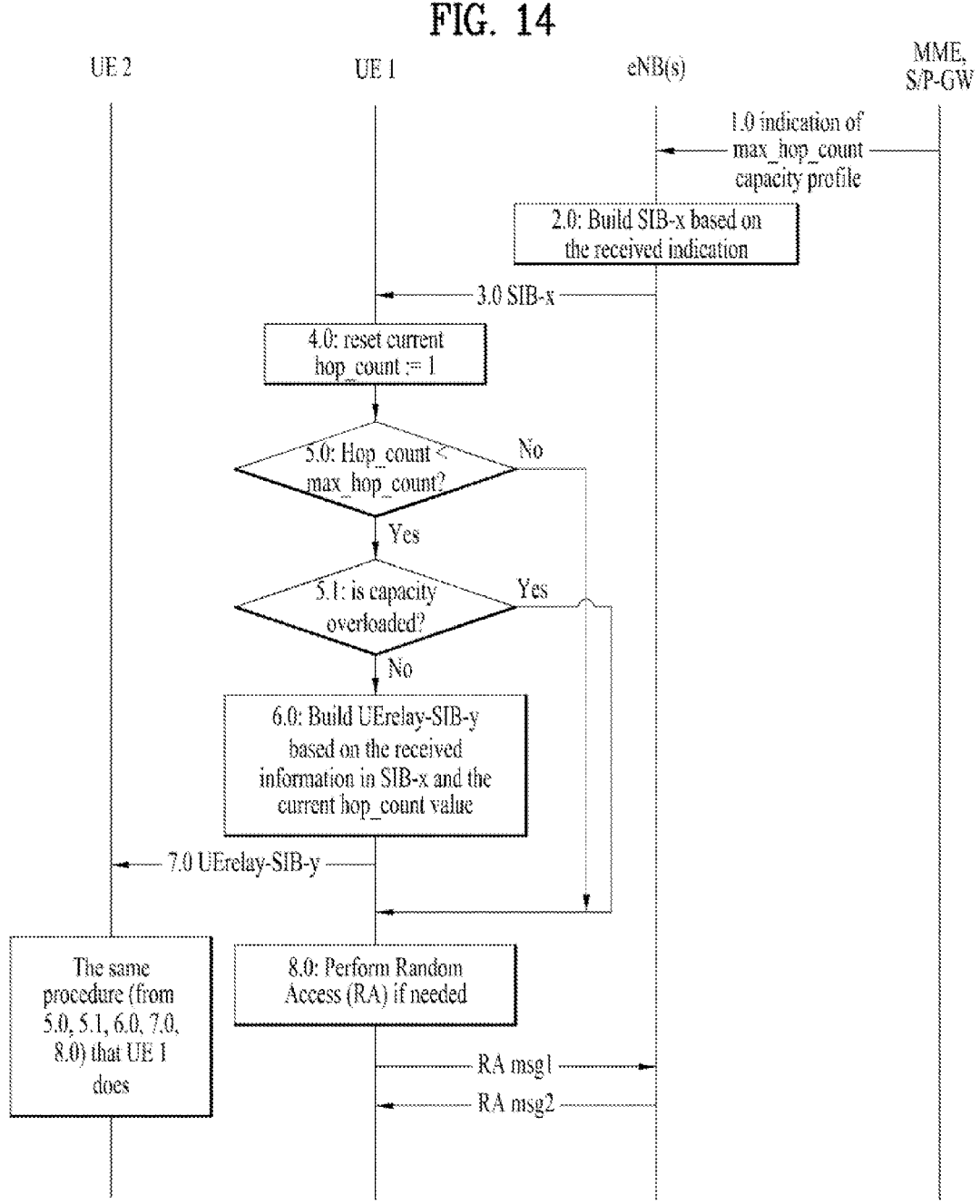
FIGS. 14~15 illustrate dynamic configuration of relaying functions (e.g., hop count, capacity profile) in accordance with the present invention.
Figure 15:
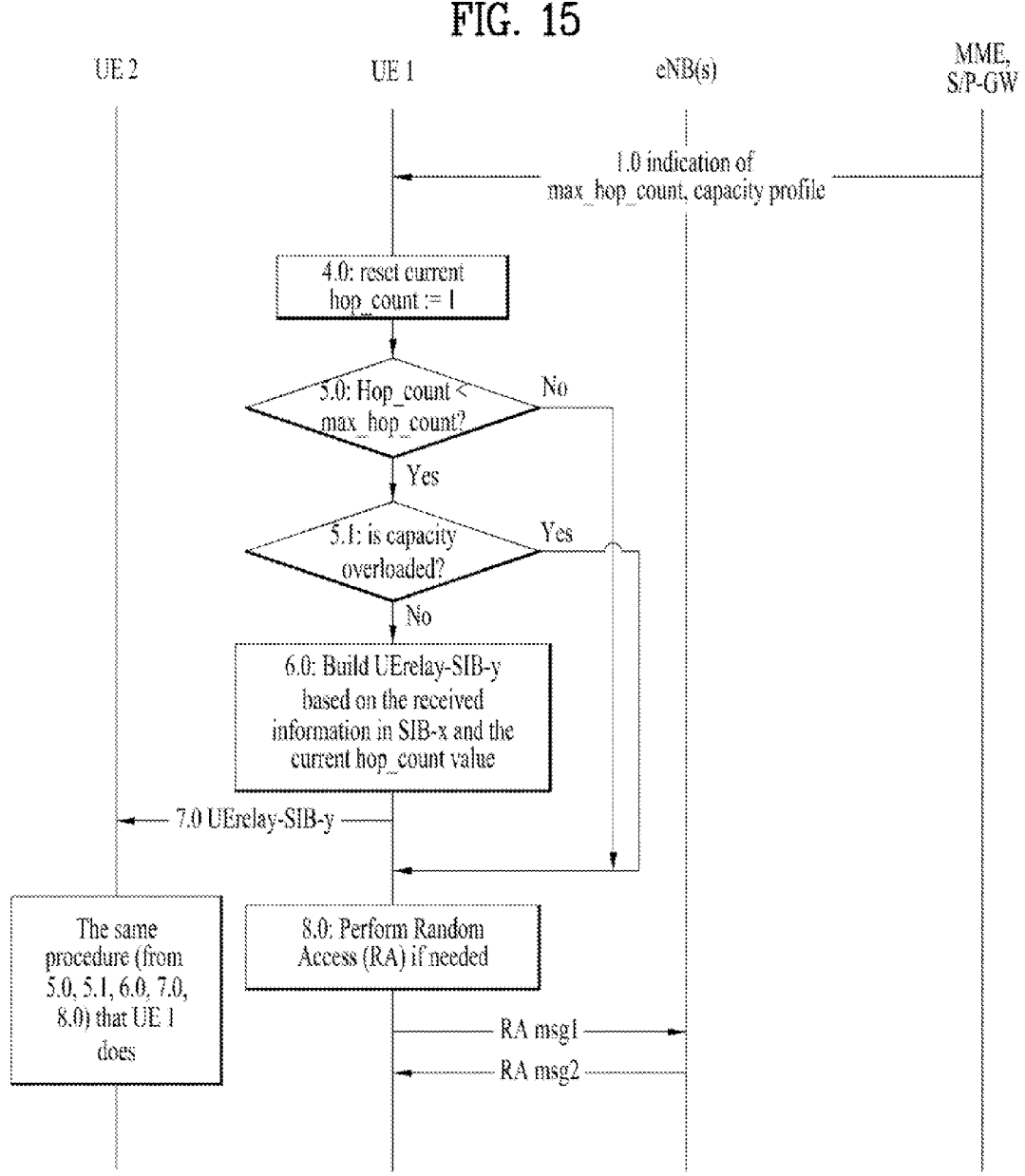

FIGS. 14~15 shows dynamic configuration of relaying functions (e.g., hop count, capacity profile) in accordance with the present invention. FIG. 14 shows a case in accordance with Method 1.1, and FIG. 15 shows a case in accordance with Method 1.2.

With reference to FIG. 14, the dynamic configuration may be performed as follows:

Step 1.0: A higher network node (e.g., MME, S/P-GW) may send configuration information for relaying functions to eNB(s). The configuration information may indicate for example a maximum number of hop counts (max_hop_count) and/or a capacity profile. The configuration information may be delivered based on geographic locations regardless of subscription profile(s) of UEs residing in the geographical area of the eNB(s).

Step 2.0: The eNB may build SIB Type X (SIB-x) based on the configuration information. The SIB-x may be an existing SIB or a newly defined SIB. The SIB-x may be transmitted via a PDSCH signal. The PDSCH signal including the SIB-x may be scheduled by a PDCCH signal having a CRC scrambled with SI-RNTI.

Step 3.0: The eNB may broadcast the SIB-x including the configuration information for relaying functions (i.e., UE common signaling).

Step 4.0: Upon receipt of the SIB-x, a UE (e.g., UE 1) may reset a current hop count (hop_count) to an initial value (e.g., 1).

Step 5.0: UE 1 may check if the hop_count (i.e., 1) is less than the max_hop_count. A case when the hop_count (i.e., 1) is less than the max_hop_count means that UE 1 may be allowed acting as a UE relay in accordance with the capacity profile. Meanwhile, a case when the hop_count (i.e., 1) is equal to or larger than the max_hop_count means that UE 1 is not allowed acting as a UE relay. Thus, for example, if the max_hop_count is 1, no UE can get a network connection through UE 1, and no further operation regarding UE relay is performed.

Step 5.1: If the hop_count (i.e., 1) is less than the max_hop_count, then capacity profile may be examined to select which steps to follow next. If UE capability of UE 1 could not support the relaying functions indicated by the capacity profile, no UE can get a network connection through UE 1, and thus no further operation regarding UE relay is performed. Meanwhile, if UE capability of UE 1 could partially support the relaying functions indicated by the capacity profile, UE 1 may not act as a UE relay or may partially support relaying functions indicated by the capacity profile within its capability.

Step 6.0: UE 1 may build a broadcast signal (for convenience, UErelay-SIB-y) based on the configuration information in the SIB-x and the current hop count. UErelay-SIB-y may include the configuration information of SIB-x and further include information indicating a hop_count of a previous UE (i.e., UE 1). The UErelay-SIB-y may be transmitted via a PDSCH signal. The PDSCH signal including the UErelay-SIB-y may be scheduled/indicated by a PDCCH signal having a CRC scrambled with a UE-common ID other than the SI-RNTI. For example, the UE-common ID may include a group ID, a service ID or a newly assigned UE-common RNTI.

Step 7.0: UE 1 may broadcast or multicast the UErelay-SIB-y to neighboring UEs. In this case, a neighboring UE (e.g., UE 2) may perform the same procedure (e.g., steps 5.0 to 8.0) that UE 1 does except that UE 2 may further perform a step of increasing its hop_count by 1.

Step 8.0: If necessary, UE 1 may perform a random access procedure, and act as a UE relay between the network (e.g., eNB) and another UE.

With reference to FIG. 15, the configuration information for relaying functions may be delivered based on UE's subscription profile (e.g., UE capability) and be delivered periodically on a regular basis or at any time as needed (Step 1.0). For example, the configuration information may be transmitted to UE(s) using a paging procedure. In this case, an eNB transparently transfers the configuration information from a higher network node (e.g., MME, S/P-GW) to UE(s). For example, a paging message including the configuration information may be transmitted to the UE 1 via a PDSCH signal, and the PDSCH signal is scheduled by a PDCCH signal having a CRC scrambled with P-RNTI. The PDCCH signal having a CRC scrambled with P-RNTI may be periodically monitored by UE 1, in which periodic transmission interval may be determined by an ID of UE 1. In a procedure of FIG. 15, steps 2.0 to 3.0 of FIG. 14 are not applied, but steps 4.0 to 8.0 of FIG. 14 are applied in a same way.

In order to help understanding of the invention, it may be assumed that UE 1 of FIGS. 14~15 may correspond to UE 0 of FIGS. 9~10, UE 1.1~UE 1.2 of FIGS. 12~13.

As a next procedure, if a UE attempts to request relaying to another UE, two methods may be considered. In this case, it may be assumed that the UE may be able to indicate a cause of the request. The cause of the request may be for example a mutual UE relay, a normal UE relay, a direct communication, a connection to a network or a connection to another UE.

Method 2.1: EPC Makes Decisions

Action of Requesting UE: When a ProSe-enabled UE in a GCSE_LTE group attempts to request relaying connection(s) to another ProSe-enabled UE, the UE can include an indication why the request is being made.

Action of Requested UE: The ProSe-enabled UE which is being requested for relaying by another ProSe-enabled UE, the UE may deliver the indication to the EPC if appropriate.

Action of Network (e.g., EPC): The EPC can make a decision based on the cause and make a response to the "Requested UE".

Action of Requested UE: This UE can follow the received decision (from EPC) and make a response to the "Requesting UE". In accordance with the decision, the Requested UE may or may not provide a relaying connection to the Requesting UE.

Method 2.2: Requested UE Makes Decisions

Action of Requesting UE: When a ProSe-enabled UE in a GCSE_LTE group attempts to request relaying connection(s) to another ProSe-enabled UE, the UE can include an indication why the request is being made.

Action of Requested UE: The ProSe-enabled UE which is being requested for relaying by another ProSe-enabled UE, the UE can make decision based on the cause and make a response to the "Requesting UE". In accordance with the decision, the Requested UE may or may not provide a relaying connection to the Requesting UE.

In Methods 2.1~2.2, the request for relaying may further information indicating a hop count of the Requesting UE, and the network or the Requested UE may make a decision to the request further considering the hop count and a max hop count. As an example, a request message for a relay connection may be received from the Requesting UE using a physical shared channel (e.g., PDSCH, PUSCH), and the physical shared channel may be scrambled using a group Identifier (ID), a service ID or a newly assigned UE-common RNTI. In this case, a value of the hop count may be used to determine an initialization value for a scrambling sequence. For example, the physical shared channel is scrambled using a scrambling sequence having an initialization value of the following equation:

$$c_{init} = h \cdot 2^{13} + \lfloor n_s/2 \rfloor \cdot 2^9 + ID$$

where h is a (current) hop count, $n_s$ is a slot number in a radio frame, ID is the group ID, the service ID or the newly assigned UE-common RNTI, and $\lfloor \ \rfloor$ is a flooring function.

The scrambling sequence c(n) may be generated by using following equation:

$$c(n) = (x_1(n+N_C) + x_2(n+N_C)) \bmod 2$$

$$x_1(n+31) = (x_1(n+3) + x_1(n)) \bmod 2$$

$$x_2(n+31) = (x_2(n+3) + x_2(n+2) + x_2(n+1) + x_2(n)) \bmod 2$$

where n=0, 1, ..., $M_{PN}$-1, $M_{PN}$ is a sequence length, $N_C$=1600, $$x_1(0)=1, x_1(n)=0, n=1,2,\ldots,30, \text{ and}$$

$$\Sigma_{i=0}^{30} x_2(i) \cdot 2^i = c_{init} = h \cdot 2^{13} + \lfloor n_s/2 \rfloor \cdot 2^9 + ID$$

Figure 16:
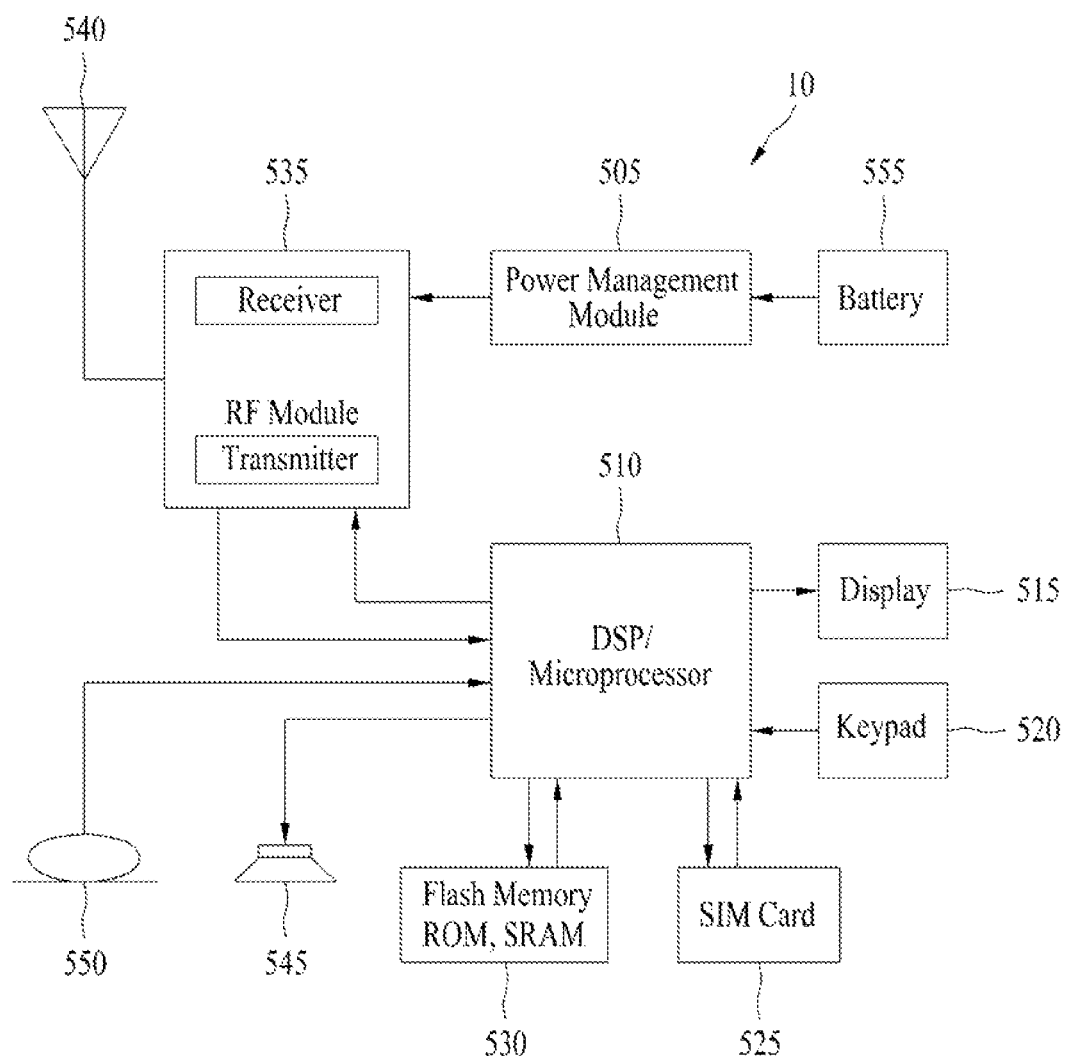
FIG. 16 illustrates a block diagram of a UE or Mobile Station (MS).

FIG. 16 illustrates a block diagram of a UE or Mobile Station (MS) 10. The UE 10 includes a MTC device or a delay-tolerant device. The UE 10 includes a processor (or digital signal processor) 510, RF module 535, power management module 505, antenna 540, battery 555, display 515, keypad 520, memory 530, SIM card 525 (which may be optional), speaker 545 and microphone 550.

A user enters instructional information, such as a telephone number, for example, by pushing the buttons of a keypad 520 or by voice activation using the microphone 550. The microprocessor 510 receives and processes the instructional information to perform the appropriate function, such as to dial the telephone number. Operational data may be retrieved from the Subscriber Identity Module (SIM) card 525 or the memory module 530 to perform the function. Furthermore, the processor 510 may display the instructional and operational information on the display 515 for the user's reference and convenience.

The processor 510 issues instructional information to the RF module 535, to initiate communication, for example, transmits radio signals comprising voice communication data. The RF module 535 comprises a receiver and a transmitter to receive and transmit radio signals. An antenna 540 facilitates the transmission and reception of radio signals. Upon receiving radio signals, the RF module 535 may forward and convert the signals to baseband frequency for processing by the processor 510. The processed signals would be transformed into audible or readable information outputted via the speaker 545, for example. The processor 510 also includes the protocols and functions necessary to perform the various processes described herein.

The aforementioned embodiments are achieved by combination of structural elements and features of the present invention in a predetermined fashion. Each of the structural elements or features should be considered selectively unless specified otherwise. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with other claims referring to the other claims other than the specific claims to constitute the embodiment or add new claims by means of amendment after the application is filed.

The embodiments of the present invention have been described based on data transmission and reception between a BS (or eNB) and a UE. A specific operation which has been described as being performed by the eNB (or BS) may be performed by an upper node of the BS (or eNB) as the case may be. In other words, it will be apparent that various operations performed for communication with the UE in the network which includes a plurality of network nodes along with the BS (or eNB) can be performed by the BS or network nodes other than the BS (or eNB). The BS may be replaced with terms such as fixed station, Node B, eNode B (eNB), and access point. Also, the term UE may be replaced with terms such as mobile station (MS) and mobile subscriber station (MSS).

The embodiments according to the present invention can be implemented by various means, for example, hardware, firmware, software, or combinations thereof. If the embodiment according to the present invention is implemented by hardware, the embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a module, a procedure, or a function, which performs functions or operations as described above. Software code may be stored in a memory unit and then may be driven by a processor. The memory unit may be located inside or outside the processor to transmit and receive data to and from the processor through various well known means.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The present invention can be applied to a method and an apparatuses for a proximity-based service, specifically, for cooperative discovery (i.e., node cooperation) for the proximity-based service.

The invention claimed is:

1. A method of supporting a group communication by a first user equipment (UE) in a wireless communication system, the method comprising:
   establishing a communication connection with a second UE via a first relay UE; and
   receiving, from the first relay UE, a message including a request for a relay connection, the message including first information indicating a current hop count, second information indicating a maximum number of allowed hops, and third information on a capacity profile which indicates a maximum number of allowed subordinated UEs,
   wherein if a condition is satisfied, the relay connection is provided between the first relay UE and a third UE via a second relay UE, the second relay UE being the first UE,
   wherein if the condition is not satisfied, the request for the relay connection is rejected, and
   wherein the condition includes: the current hop count is less than the maximum number of allowed hops, and a number of UEs served by the first UE is less than the maximum number of allowed subordinated UEs.

2. The method of claim 1, wherein the capacity profile further indicates a relay mode of the first UE, and the condition further includes: the relay mode allows that relay UEs are mutually served from each other.

3. The method of claim 1, wherein fourth information indicating a cause for the relay connection is further received from a network node using a paging message, and the condition further includes: the cause for the relay connection is allowed by the first UE.

4. The method of claim 1, wherein the message requesting the relay connection is received from the first relay UE using a physical shared channel, and the physical shared channel is scrambled using a group Identifier (ID) or a service ID.

5. The method of claim 4, wherein the physical shared channel is scrambled using a scrambling sequence having an initialization value of the following expression:

$$c_{init} = h \cdot 2^{13} + \lfloor n_s/2 \rfloor \cdot 2^9 + \text{ID}$$

where c is the current hop number, h is a current hop count, $n_s$ is a slot number in a radio frame, ID is the group ID or the service ID, and $\lfloor \ \rfloor$ is a flooring function.

6. A first user equipment (UE) configured to support a group communication in a wireless communication system, the first UE comprising:
   a radio frequency (RF) unit; and
   a processor operably coupled with the RF unit,
   wherein the processor is configured to:
      establish a communication connection with a second UE via a first relay UE, and
      receive, from the first relay UE, a message including a request for a relay connection, the message including first information indicating a current hop count, second information indicating a maximum number of allowed hops, and third information on a capacity profile which indicates a maximum number of allowed subordinated UEs,
   wherein if a condition is satisfied, the relay connection is provided between the first relay UE and a third UE via a second relay UE, the second relay UE being the first UE,
   wherein if the condition is not satisfied, the request for the relay connection is rejected,
   wherein the condition includes: the current hop count is less than the maximum number of allowed hops, and a number of UEs served by the first UE is less than the maximum number of allowed subordinated UEs.

7. The wireless device of claim 6, wherein the capacity profile further indicates a relay mode of the first UE, and the condition further includes: the relay mode allows that relay UEs are mutually served from each other.

8. The first UE of claim 6, wherein fourth information indicating a cause for the relay connection is further received from a network node using a paging message, and the condition further includes: the cause for the relay connection is allowed by the first UE.

9. The first UE of claim 6, wherein the message requesting the relay connection is received from the first relay UE using a physical shared channel, and the physical shared channel is scrambled using a group Identifier (ID) or a service ID.

10. The first UE of claim 9, wherein the physical shared channel is scrambled using a scrambling sequence having an initialization value of the following expression:

$$c_{init} = h \cdot 2^{13} + \lfloor n_s/2 \rfloor \cdot 2^9 + \text{ID}$$

where c is the current hop number, h is a current hop count, $n_s$ is a slot number in a radio frame, ID is the group ID or the service ID, and $\lfloor \ \rfloor$ is a flooring function.

* * * * *